(12) United States Patent
Lee et al.

(10) Patent No.: US 8,238,048 B2
(45) Date of Patent: Aug. 7, 2012

(54) CAMERA MODULE

(75) Inventors: Chai-Wei Lee, Taipei Hsien (TW);
Hou-Yao Lin, Taipei Hsien (TW);
Sheng-Jung Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 202 days.

(21) Appl. No.: 12/748,459

(22) Filed: Mar. 29, 2010

(65) Prior Publication Data

US 2011/0080664 A1    Apr. 7, 2011

(30) Foreign Application Priority Data

Oct. 7, 2009 (CN) .......................... 2009 1 0308110

(51) Int. Cl.
*G02B 7/02* (2006.01)

(52) U.S. Cl. ....................................... 359/822
(58) Field of Classification Search .................... 359/822
See application file for complete search history.

(56) References Cited

U.S. PATENT DOCUMENTS 2,238,371 A * 4/1941 Pollock .......................... 396/533
* cited by examiner

*Primary Examiner* — Joseph P Martinez
(74) *Attorney, Agent, or Firm* — Altis Law Group, Inc.

(57) ABSTRACT

An exemplary camera module includes a barrel, a holder, and an resilient member. The holder is loosely threadedly coupled to the barrel. The holder has a central axis. The resilient member is positioned between the barrel and the holder. The resilient member is configured for exerting a first elastic force to the barrel and a second elastic force to the holder so that the barrel is fixed with the holder. The first and second elastic forces are in a direction parallel to the central axis of the holder.

9 Claims, 3 Drawing Sheets

CAMERA MODULE

BACKGROUND

1. Technical Field

The present disclosure relates to optical imaging, and particularly to a camera module with a clearance fit engagement between a barrel and a holder thereof.

2. Description of Related Art

A typical camera module includes a holder and a barrel. In order to keep the barrel in place, the barrel is tightly screwed to the holder. The holder holds the barrel in a locking position using the threads. Because the barrel is tightly screwed, it is difficult to assemble the barrel into the holder during assembly. Sometimes the barrel may become jammed/stuck in the holder.

Therefore, a new camera module is desired to overcome the above-mentioned problem.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION

An embodiment will now be described in detail below with reference to the drawings.

Figure 1:
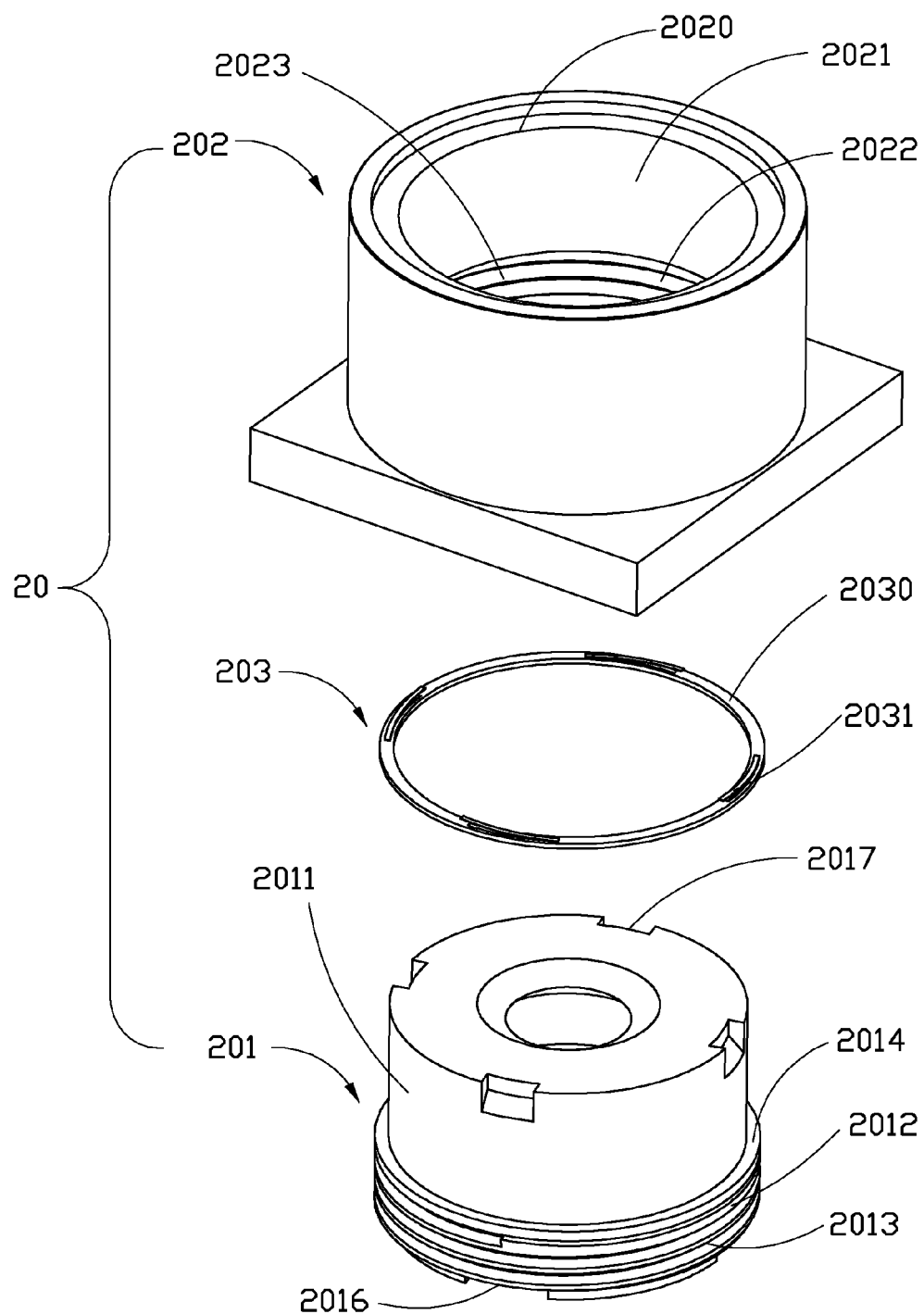
FIG. 1 is an exploded perspective view of a camera module according to an exemplary embodiment.
Figure 2:
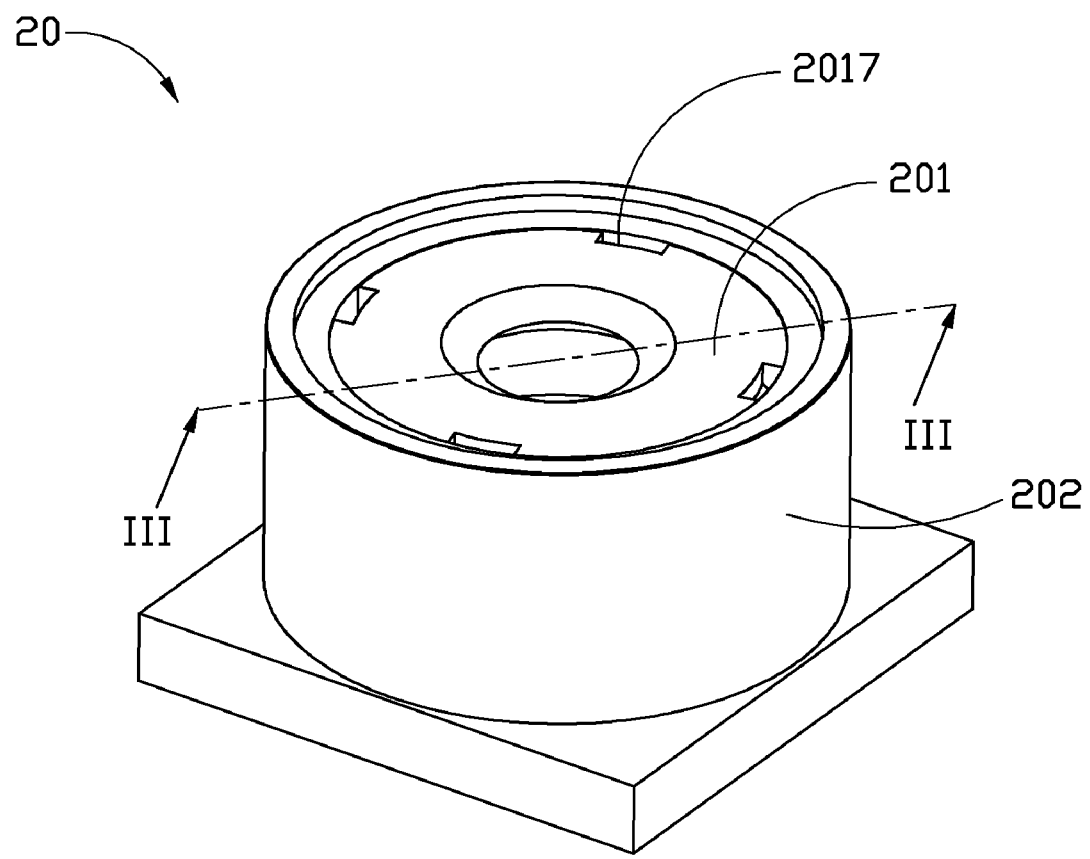
FIG. 2 is an assembled perspective view of the camera module of FIG. 1.
Figure 3:
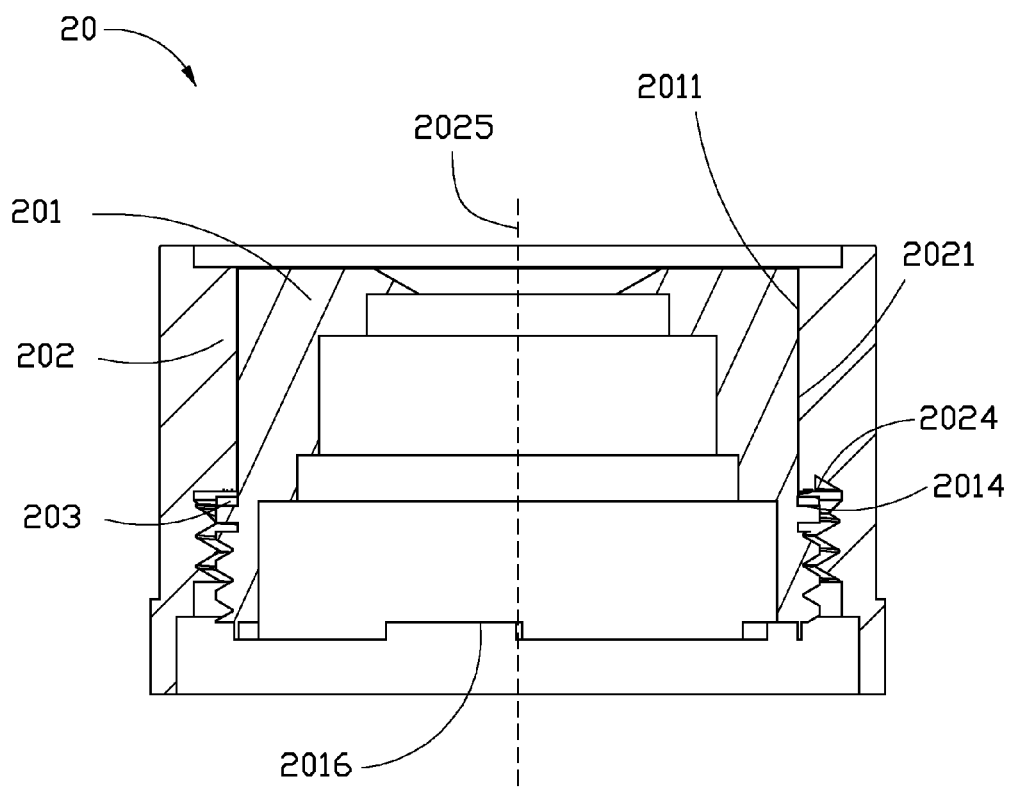
FIG. 3 is a sectional view of the camera module of FIG. 2 taken along the line III-III thereof.

Referring to FIGS. 1-3, a camera module 20 according to an exemplary embodiment is shown. The camera module 20 includes a barrel 201, a holder 202, a resilient member 203, and a plurality of optical elements (e.g., lenses; not shown) received in the barrel 201.

The barrel 201 includes a first cylindrical part 2011 and a first threaded part 2012 in that order from the object side to the image side. The first threaded part 2012 has a plurality of external threads 2013. In the present embodiment, the first threaded part 2012 consists of 2-3 external threads 2013. Namely, the barrel 201 can only be rotated two to three turns relative to the holder 202. An outer diameter of the first cylindrical part 2011 is less than that of the external threads 2013. The barrel 201 further includes a first surface 2014 connecting the first cylindrical part 2011 and the first threaded part 2012. The first surface 2014 faces the object side.

The holder 202 is hollow and includes a through hole 2020. The barrel 201 is received in the through hole 2020. The holder 202 includes a second cylindrical part 2021 and a second threaded part 2022 from the object side to the image side. The inner cylindrical surface of the second cylindrical part 2021 is in contact with the outer cylindrical surface of the first cylindrical part 2011. The second threaded part 2022 includes a plurality of internal threads 2023. In the present embodiment, the second threaded part 2022 includes 2-3 internal threads 2023. The fit between the internal thread 2023 and the external thread 2013 is a clearance fit. That is, the internal thread 2023 is loosely coupled with the external thread 2013 of the barrel 201. An inner diameter of the second cylindrical part 2021 is less than an outer diameter of the second threaded part 2022. The holder 202 further includes a second surface 2024 connecting the second cylindrical part 2021 and the second threaded part 2022. The second surface 2024 faces the image side.

In the present embodiment, the resilient member 203 is a ring-shaped spring. The resilient member 203 includes a ring-shaped part 2030 and elastic plates 2031. One end of each elastic plate 2031 is connected to the ring-shaped part 2030, the other end of each elastic plate 2031 curves (or bends) in a direction away from the ring-shaped part 2030, thus forming a free end. The first cylindrical part 2011 is nested in the resilient member 203. The resilient member 203 surrounds the first cylindrical part 2011, and is positioned between the first surface 2014 and the second surface 2024. When the resilient member 203 is compressed along a direction parallel to a central axis 2025 of the holder 202, the resilient member 203 exerts a downward elastic force towards the first surface 2014 and an upward elastic force towards the second surface 2024 both in a direction parallel to the central axis 2025 of the holder 202. The downward elastic force is perpendicular to the first surface 2014, and the upward elastic force is perpendicular to the second surface 2024. The downward elastic force and the upward elastic force are in reverse directions. In this way, the barrel 201 is kept stable relative to the holder 202.

In the present embodiment, the resilient member 203 includes four elastic plates 2031 equidistant from each other. It is to be understood that, in other embodiments, the total number of elastic plates can be two, three, and so on.

In the present embodiment, the elastic plates 2031 similarly curve away from the same side of the resilient member 203. It should be noted that, in other embodiments, the elastic plates 2031 can protrude from different sides (i.e., two opposite sides) of the resilient member 203.

Further, a plurality of recesses 2016 are defined in one end of the barrel 201 facing the image side. In assembly of the camera module 20, the barrel 201 can be held in place by a tool (not shown), such as a clamp used at the recesses 2016.

Even further, a plurality of recesses 2017 are defined in another end of the barrel 201 facing the object side. The recesses 2017 are configured for engaging with a focus ring (not shown).

In the camera module 20, because the fit between the barrel 201 and the holder 202 is a clearance fit, it is easy to assemble the barrel 201 to the holder 202 and rotate the barrel 201 relative to the holder 202 in achieving focusing.

While certain embodiment have been described and exemplified above, various other embodiment from the foregoing disclosure will be apparent to those skilled in the art. The present disclosure is not limited to the particular embodiment described and exemplified but is capable of considerable variation and modification without departure from the scope and spirit of the appended claims.

What is claimed is:

1. A camera module comprising:
a barrel comprising a first cylindrical part and a first threaded part in an order from an object side to an image side;
a holder loosely threadedly coupled to the barrel, the holder having a central axis; and
a compressed resilient member sandwiched between the barrel and the holder, the resilient member being ring-shaped, and the first cylindrical part extending through the resilient member, the resilient member being configured for exerting a first spring force to the barrel and a second spring force to the holder so that the barrel is secured to the holder, wherein the first and second spring forces are in a direction substantially parallel to the central axis of the holder.

2. The camera module of claim 1, wherein the holder comprises a second cylindrical part and a second threaded part in an order from the object side to the image side, the first threaded part comprises a plurality of external threads formed thereon, the second threaded part comprises a plurality of internal threads formed thereon, the barrel is coupled to the holder via engagement between the internal threads and the external threads, and a clearance is formed between the internal threads and the external threads.

3. The camera module of claim 2, wherein the inner cylindrical surface of the second cylindrical part is in contact with the outer cylindrical surface of the first cylindrical part.

4. The camera module of claim 2, wherein an outer diameter of the first cylindrical part is less than that of the external threads, and an inner diameter of the second cylindrical part is less than an outer diameter of the internal threads.

5. The camera module of claim 4, wherein the first threaded part comprises a first surface facing the object side, the second cylindrical part comprises a second surface facing the image side, and the resilient member is sandwiched between the first surface and the second surface.

6. The camera module of claim 5, wherein the first spring force is substantially perpendicular to the first surface, and the second spring force is substantially perpendicular to the second surface.

7. The camera module of claim 2, wherein the first threaded part consists of 2-3 external threads.

8. The camera module of claim 2, wherein the second threaded part consists of 2-3 internal threads.

9. The camera module of claim 1, wherein the first and the second spring forces are in reverse directions.

* * * * *